United States Patent [19]

Smietana

[11] Patent Number: 4,915,964

[45] Date of Patent: Apr. 10, 1990

[54] METHOD OF MAKING A CONICALLY SHAPED TORTILLA SHELL

[76] Inventor: Leo P. Smietana, 16696 Forrest St., Victorville, Calif. 92392

[21] Appl. No.: 293,889

[22] Filed: Jan. 5, 1989

[51] Int. Cl.$^4$ .................. A23L 1/164; A23P 1/10
[52] U.S. Cl. .................................. 426/282; 99/428; 426/93; 426/138; 426/307; 426/439; 426/502; 426/505; 426/514; 426/549
[58] Field of Search .............. 426/439, 391, 94, 138, 426/502, 505, 514, 549, 560, 93, 282, 307; 425/319, 394, 412; 99/426, 428, 439

[56] References Cited

U.S. PATENT DOCUMENTS

| | | | |
|---|---|---|---|
| 3,410,691 | 11/1968 | Stanley | 426/138 X |
| 3,424,076 | 1/1969 | Bernatz et al. | 99/426 X |
| 3,604,342 | 9/1971 | Harding | 99/426 |
| 4,313,964 | 2/1982 | Dembecki | 426/439 X |
| 4,735,811 | 4/1988 | Skara et al. | 426/138 X |

Primary Examiner—Arthur L. Corbin
Attorney, Agent, or Firm—Bernard L. Kleinke; Jerry R. Potts; William Patrick Waters

[57] ABSTRACT

A method of making a tortilla cone with a closed apex, and including a kit to help facilitate the operation so that a large number of tortilla cones may be formed and cooked at one time. The kit and method of using it includes a set of cone forming molds each consisting of a pliable metallic conical body having an overlapping convex surface about which a tortilla patty having a tear shape may be positioned and wrapped in cone from so as to close the come form at its apex. The method of using the kit includes using a first mold as a female receptacle and using a second mold as both a female and male receptacle to wrap a tortilla patty to the mold and secure the same between the two molds.

11 Claims, 5 Drawing Sheets

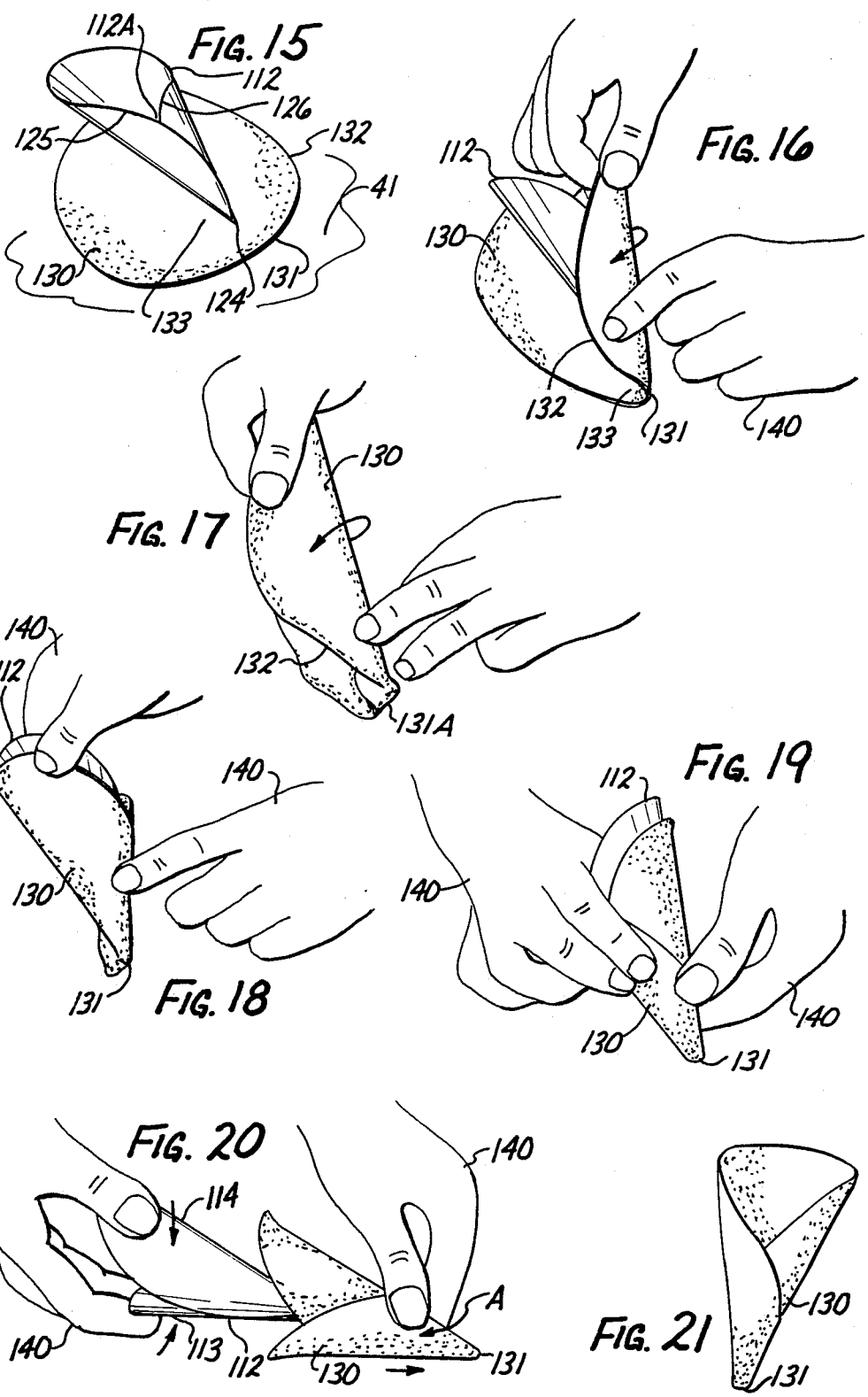

METHOD OF MAKING A CONICALLY SHAPED TORTILLA SHELL

TECHNICAL FIELD

The present invention relates in general to a food processing kit and a method of making and using it, and more particularly relates to a kit and a method of making and using the kit to make hard and soft tortilla cones.

BACKGROUND ART

With the advances in today's fast food industry it has become very desirable to prepare and sell food products that are easily prepared and served. One of the more popular food items in this regard is the taco which is a hard crisp folded tortilla patty stuffed with ground meat, lettuce, tomato and cheese. Although this particular food product is easily prepared and served, it is extremely messy to eat as the stuffing matter has a tendency to fall out the opened ends of the folded tortilla patty. In an attempt to solve this problem, it has been found that a cone-shaped crisp tortilla patty is very effective because it is not easily subject to having stuffing matter fall out as the cone shaped product is eaten.

As it is highly desirable to serve a taco type food product in a crisp tortilla patty having a cone shape that is easily prepared, there have been many different types and kinds of apparatus and techniques for making tortilla cones. For example, reference may be made to the following U.S Pat. Nos. 1,079,597; 1,274,506; 3,424,076; 3,604,342; and Des. 292,940.

While such prior known devices may have been successful for some applications, it has been difficult, if not impossible, to make a tortilla or taco cone with a closed tip end in a simple and efficient manner. In this regard, for example, when a tortilla is folded or rolled into a cone shape, it is very difficult to create a closed end at the apex of the cone. In this regard, with the tip end open, the food contents of the edible cone can fall or drip therefrom in a messy, unsatisfactory manner.

Therefore, it is frequently necessary after cooking the tortilla patty into a crisp hard shell having a general conical shape, to stuff the inner end portion of the cone with a solid, non-dripping type food, such as a piece of room temperature cheese or the like, to seal over the open end, and thus to assure that the food filling placed within the taco cone, does not drip or fall out of its open bottom end.

Such a make-shift solution is not entirely satisfactory, because it requires additional preparation tip and it is not sufficiently accurate to assure that the tip of the cone is always closed by the cheese.

Therefore, it would be highly desirable to have a new and improved kit and method for making and using the kit to make a taco cone with a closed apex to eliminate the careful stuffing thereof. Such a kit should be relatively inexpensive to manufacture, and should be used in a convenient manner. In this regard, it would be highly desirable to have a method which is fast and efficient to execute, so as to minimize the time and effort involved.

Some attempts have been made to create a taco cone with a closed apex. One such attempted technique disclosed in U.S. Pat. No. 3,604,343 includes using a mold having a conical body about which a tortilla patty may be wrapped in cone form with the opposite edges of the tortilla patty overlapping. In this manner, the cone is formed at its apex in a substantially closed manner, and then it is clamped at the overlapping portions of the tortilla to hold it in place on the cone body. The cone forming device with the clamped tortilla patty is then suspended in a vessel of hot cooking oil to cook the patty.

While such an attempt may well produce a taco cone, it appears that such a technique may well be less than totally satisfactory, in that it requires a complex and awkward clamping technique in an attempt to close the apex of the cone that is not fast and efficient, nor convenient to use. Moreover, the device and technique does not produce a closed apex shell because of the round tortilla patty used in the process. Neither does the device and technique readily lend itself to modern mass production techniques that could minimize time and effort.

Therefore, it would be highly desirable to have a new and improved kit and method of using the kit, for overcoming the problems associated with using clamps. In this respect, the inventive kit should not require the utilization of cumbersome clamps, and it should be usable by novice and inexperienced operators in a fast efficient manner both in the home and in a fast food restaurant.

Another attempted solution to the concerns associated with the prior art is disclosed in U.S. Pat. No. 3,424,076 and includes using a two piece mold. The mold includes a carriage tray having a plurality of conical-shaped wire female receptacle baskets for receiving one or more pliable tortillas rolled in a cone shape. A male retaining member is utilized to fit concentrically within the female receptacles. This assembly is then submerged into a vessel of hot cooking oil to cook the tortilla patties.

This attempt has also proven less than satisfactory, in that only a few taco cones may be formed and cooked at one time. Also when using the open female receptacle, it is extremely difficult, if not impossible, to ensure that a closed apex is formed with the edges of the pliable tortilla overlapped, because the operator must completely release the pliable tortilla in the female receptacle prior to inserting the male member within the female receptacle.

Therefore, it would be highly desirable to have a new and improved kit and method of using it, which reduces greatly, if not eliminates entirely, the apex hole problem, and which also renders the cone forming operation precise and controllable so that each cone formed will have a substantially closed apex. Moreover such a kit should be highly efficient and convenient to use, so that a large number of taco cones may be cooked at one time.

DISCLOSURE OF INVENTION

The principal object of the current invention is to provide a new and improved kit, as well as a method of using it to produce a hard or soft tortilla cone with a substantially closed apex.

Another object of the current invention is to provide a new and improved kit for making tortilla cones, which is relatively inexpensive to manufacture and relatively convenient to use.

Another object of the current invention is to provide a new and improved kit for making tortilla cones in a highly efficient manner, so as to minimize the time and effort involved.

Another object of the present invention is to provide a new and improved taco cone mold, and method of manufacturing it at a low cost.

Briefly, the above and further objects of the present invention are realized by providing a method to make a tortilla cone with a closed apex, and includes a kit to help facilitate the operation so that a large number of tortilla cones may be formed and cooked at one time.

The kit and method of using it includes a set of cone forming molds each consisting of a pliable metallic conical body having an overlapping convex surface about which a tortilla patty having a teardrop or oval shape may be positioned and wrapped into a cone so as to close over the cone at its apex.

The method of using the kit includes using a first hollow, cone shaped mold as a female receptacle to hold or secure a tortilla that has been wrapped about the outer surface of a second hollow cone-shaped mold serving as both a female and male receptacle. A tear drop shaped tortilla patty is wrapped around the outer surface of the second mold, by first positioning the mold on top of the tortilla patty with the apex portion of the mold being aligned in the same direction as the tip portion of the tear dropped shaped tortilla but disposed in a spaced apart manner from the tip portion of the patty. With the mold so positioned on the patty, one edge of the patty is lifted and folded over the mold so that a portion of the peripheral edge of the patty aligns with the overlapping convex surface of the second mold and folds against the top surface of the patty adjacent the apex portion of the mold. With the aligned edge of the patty held against the mold, the mold is rolled over the tortilla patty. As the mold is rolled over the tortilla patty, that portion of the tortilla patty that is folded against the top surface of the patty adjacent the apex portion of the mold tucks in under the mold adjacent the mold apex thereby folding onto itself at its apex end to form a closed apex cone-shaped tortilla patty. The wrapped hollow mold, as a male member, is then inserted into the first mold thereby securing the wrapped tortilla between the two molds.

This process may be repeated, nestling one wrapped mold within another until a desired stack of molds is achieved that approximates the diameter of any convenient cooking vessel. The stacked molds are then inserted into a vessel of hot cooking oil to cook the tortilla patty. The walls of the cooking vessel serve as a brace or clamp to prevent the molds from separating during the cooking process. Once the tortillas are cooked, the molds with the cooked tortilla thereon are removed from the hot cooking oil. The molds are then separated. Once the molds are separate each cooked tortilla patty is removed from its mold by gently sliding the cooked tortilla patty from the mold. In this manner, the desired closed apex taco cone is formed and ready to be inserted with any appropriate filling.

The inventive method of making soft tortilla cones includes using one cone-shaped hollow mold as a form to create a soft tortilla cone. The method is initiated by laying a tear-shaped tortilla patty on a flat stationary surface and then placing the mold directly on top the patty so that the apex of the mold is adjacent the apex portion of the tear-shaped tortilla but disposed in a spaced apart manner from the tip portion of the patty.

With the mold so positioned on the patty, one edge of the patty is lifted and folded over the mold so that a portion of the peripheral edge of the patty aligns with the overlapping convex surface of the second mold and folds against the top surface of the patty adjacent the apex portion of the mold. With the aligned edge of the patty held against the mold, the mold is rolled over the tortilla patty. As the mold is rolled over the tortilla patty, that portion of the tortilla patty that is folded against the top surface of the patty adjacent the apex portion of the mold tucks in under the mold adjacent the mold apex thereby folding onto itself at its apex end to form a closed apex cone-shaped tortilla patty.

With the tortilla patty held in place against the mold with one hand, the food preparer gently pushes the upper edges of the mold toward one another with his or her other hand and simultaneously pulls the tortilla patty from the mold. As the tortilla patty is removed from the mold it collapses on itself to form a soft cone shaped tortilla. This process may be repeated to produce several patties that may be conveniently stacked and packaged together in any convenient packaging material such as a clear plastic wrap.

An inventive method of making the taco cone mold includes cutting out a circular disc that approximates the size of a standard corn tortilla that has a six inch diameter from a sheet of thin pliable metallic material, such as aluminum. The pliable disc is then formed into a cone-shaped cylinder having two elliptical open ends by wrapping and forming the disc around a cone shaped wooden or metal dowel so that a pair of its sides overlap to form a generally conical shape. The pliable cone shaped disc is then removed from the dowel and is ready for use in the kit.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 15-20 are the successive steps in the method of making the soft taco cones of FIG. 21;

FIG. 21 is a pictorial view showing the soft taco cone, which is constructed in accordance with the present invention.

BEST MODE FOR CARRYING OUT THE INVENTION

Figure 1:
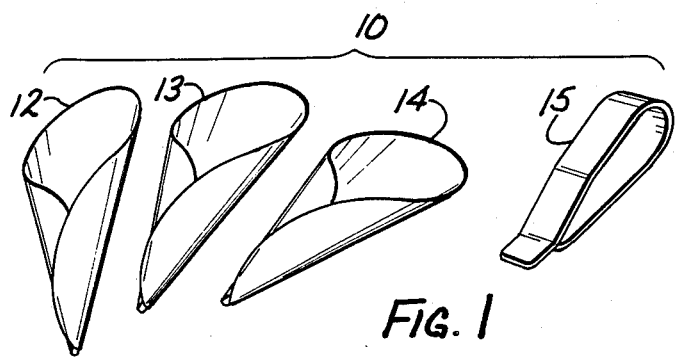
FIG. 1 is a pictorial view, illustrating operative elements of the taco cone kit, which is constructed in accordance with the present invention.
Figure 10:
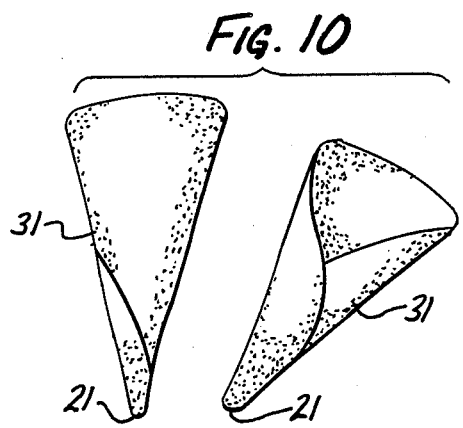
FIG. 10 is a pictorial view showing the taco cone shell, which is constructed in accordance with the present invention.

Referring now to the drawings, and more particularly to FIG. 1, there is shown a kit 10 for making tortilla or taco cones, which is constructed in accordance with the present invention. The kit 10 is used according to the method of the present invention to make a taco cone 20 as shown in FIG. 10.

As illustrated in the drawings, and more particularly to FIG. 1, there is shown a kit 10 which generally comprises a plurality of metallic conical shaped molds, such as the molds 12, 13 and 14. The kit is utilized in making the taco cone 20 that is closed at its apex end 21.

Figure 2:
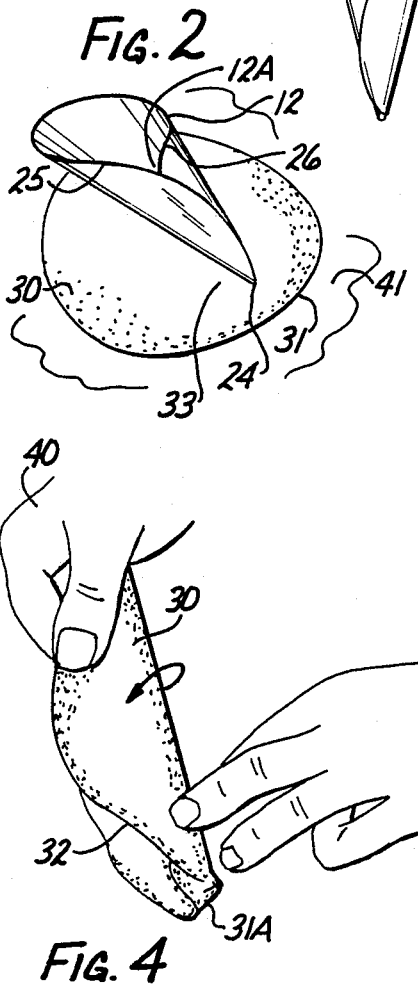
FIGS. 2-9 are views of successive steps in the method of making the taco cone of FIG. 10.

Considering now the initial step of making the taco cone 20 with reference to FIG. 2, the inventive method is initiated manually by a food preparation person 40 placing a pliable tear shaped tortilla patty 30 on a flat smooth stationary surface 41. The food preparation person 40, then lays the mold 12 on its side directly on top the tortilla patty 30 so that the apex portion 24 of the mold 12 is generally pointing in the same direction that the narrow end 31 of the patty 30 is aligned and so that point 12A where the intersecting edges 25 and 26 of the overlapping portions of the mold 12 are at about 65 to 80 degrees above the horizontal stationary surface 41. The apex portion 24 of the mold 12 is also spaced apart from the tip portion 31 of the patty 30 approximately one to one and one-eighths inches.

Figure 3:
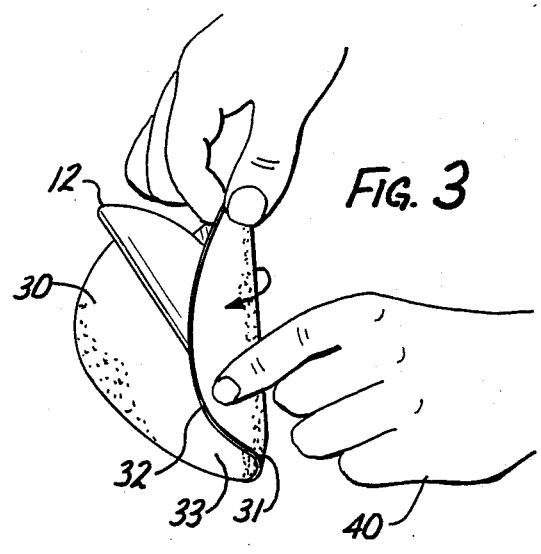

Referring now to FIG. 3 the food preparation person 40 then lifts an edge 32 of the tortilla patty 30 and generally aligns its peripheral surface 32 in a generally overlaying relationship with the edge of the exterior overlapping convex surface 26 of the mold 12 and folded against the top surface 33 of the patty 30 adjacent the apex portion 24 of the mold 12. When edge 32 of the tortilla patty 30 has been so aligned with the mold 12, the food preparation person 40 then holds the tortilla planar surface firmly to the exterior surface of the mold 12.

Figure 4:
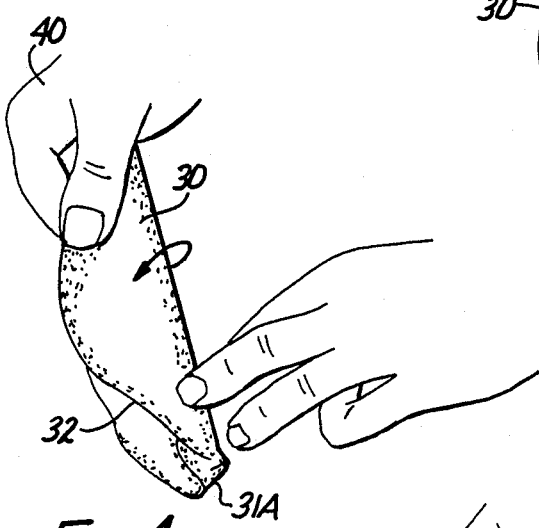

Referring now to FIG. 4, the mold 12, with the aligned tortilla patty 30, is then rolled along the stationary surface 41 until edge 32 of the patty commences to be folded under the mold 12 and against the top surface 33 of the patty 30 adjacent its narrow end 31.

The mold 12 is then further rolled over the tucked in portion 31A of the tortilla patty 30 so the patty 30 folds on itself to form a closed apex as it is wrapped around the mold 12. Once the tortilla folds on itself, the edge 32 becomes secured against the top surface 33 of the patty 30.

Figure 5:
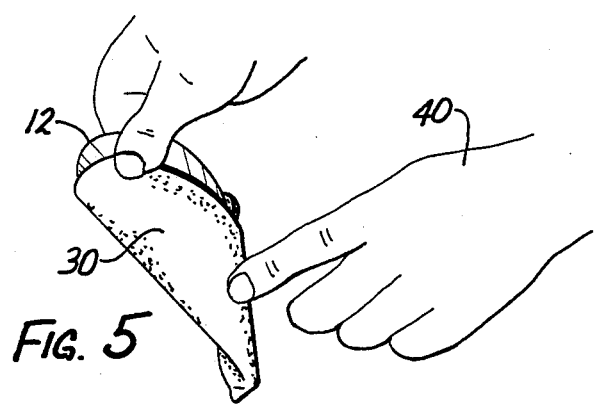

Referring now to FIG. 5, the mold 12, with the closed apex tortilla patty 30, is further rolled along the stationary surface 41 until the tortilla patty completely wraps around the mold and so that a pair of its edges slightly overlap.

Figure 6:
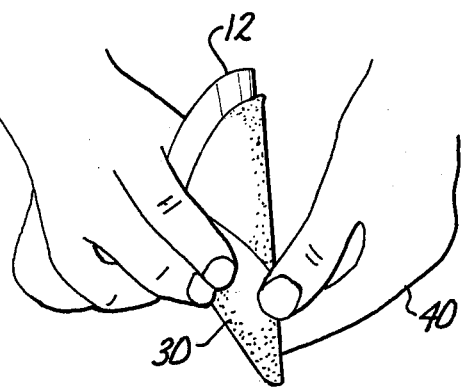
Figure 7:
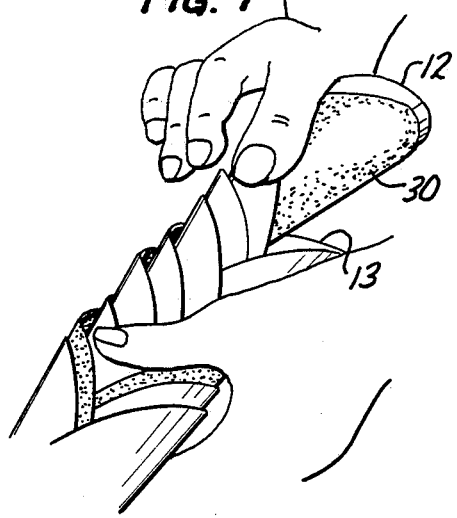

Referring now to FIGS. 6 and 7, the mold 12 with the wrapped tortilla patty 30 manually held thereto, is fully inserted, apex first, into the hollow interior of the mold 13. When so inserted, the mold 13 holds the overlapping surfaces of the tortilla patty 30 together in a secure manner, but with sufficient spacing to allow a conventional cooking oil to freely flow across the surfaces of the tortilla patty 30.

Figure 8:
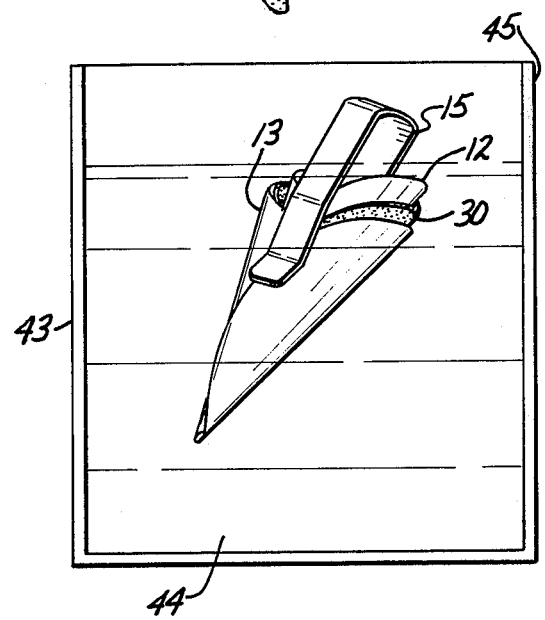

Referring now to FIG. 8, the stacked molds 12-13 are then placed in a vessel 43 of hot cooking oil 44 and cooked for approximately two minutes by deep frying the tortilla patty 30 at 375° in a conventional deep fryer. It should be understood that the vessel 43 used for holding the cooking oil 43, should be capable of holding a sufficient amount of cooking oil 44 to completely immerse the molds 12-13 with the wrapped tortilla patty 30 beneath the surface of the oil 44. It should also be understood because there is only a slight overlapping of the surfaces of the cone-shaped tortilla patty 30, the patty 30 is able to uniformly cook when emersed into the hot cooking oil 44.

Figure 9:
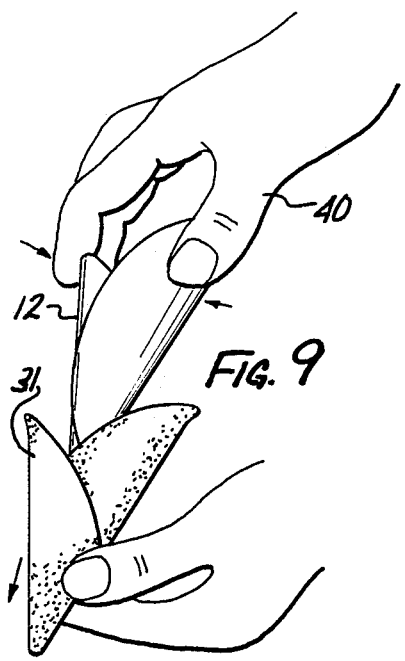

The molds 12-13 with the cooked tortilla patties or taco cones 31 are then removed from the vessel 43. Referring now to FIG. 9, the cooked tortilla patty 31 and molds 12-13 are separated. As best seen in FIG. 9, the cooked tortilla patty 31 is then removed from the exterior of the mold 12 by gently grasping the tortilla patty 31 with one hand and sliding the cooked tortilla patty or taco cone 31 from the mold 12.

It should be understood that any number of tortilla wrapped molds may be prepared, so that one wrapped mold is inserted into another in a nestling fashion thereby enabling a large number of taco cones 30 to be prepared at one time. When the stacked molds are inserted in the cooking vessel, the walls of the vessel will usually prevent the stacked molds from separating. However, when there is an excess of space between the walls 44 and 45 of the cooking vessel 43 and the nestled stack of tortilla wrapped molds so that the molds might become separated during the cooking process, the clip 15 may be used to temporarily secure the stack of molds together during the cooking process. In this manner, the molds will not separate during the cooking process. Once the tortilla patties have been cooked and removed from vessel 43, the clip 15 may be removed.

It should also be understood that a circular rather than a tear shaped tortilla may be used in this process, but results in a less desirable cone shaped shell. Because there is an excess overlapping of the surfaces of the tortilla patty. This excess overlapping of surface makes uniform cooking of the tortilla patty very difficult, if not impossible.

Thus, it is seen that there is provided a new and improved method of preparing a taco cone.

The method of making the mold 12 useful in the preparation of the taco cone 31 with a closed apex is illustrated in FIGS. 11-14.

Figure 11:
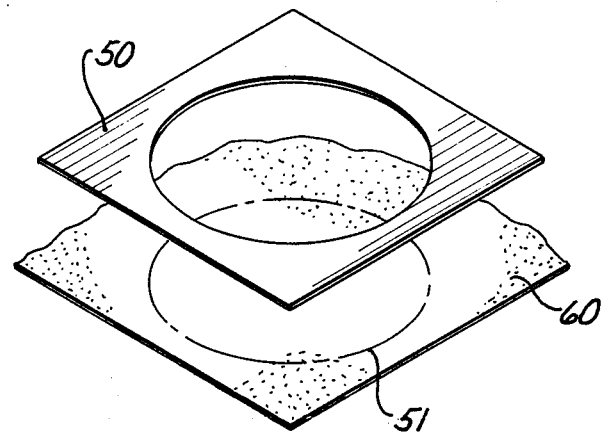
FIGS. 11-13 are the successive steps in the method of making the pliable taco cone mold of FIG. 14.

Considering now the initial step of making the mold 12, with reference to FIG. 11, the inventive method is initiated by using a circular template 50 having a diameter of approximately six inches. The template is positioned on a flat sheet of thin pliable metallic material 60 so that the template completely rests on the surface of the material 60. A score line 51 is then made, which is imparted on the material 60 along the peripheral edge of the template 50. After the score line 51 has been imparted to the surface of the material 60, the template 50 is removed. The marked material 61 is then ready for the next step of the process.

Figure 12:
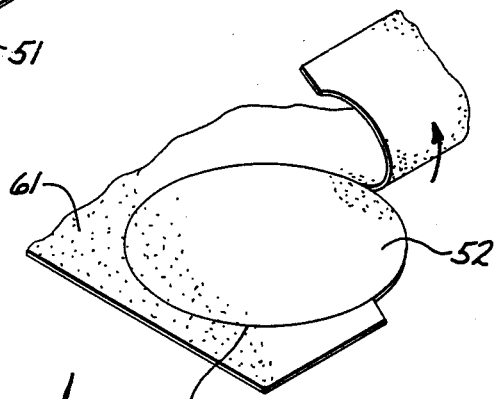

As best seen in FIG. 12, a metal cutter (not shown) is used to cut the marked material 61 along the line 51. In this manner when a cut has been made along the entire score line 51, a pliable semi-rigid circular disc 52 is formed. The edges of the disc 52 are then sanded and smooth so the disc 52 may be easily handled without the danger of being cut by any sharp or jagged edges.

Figure 13:
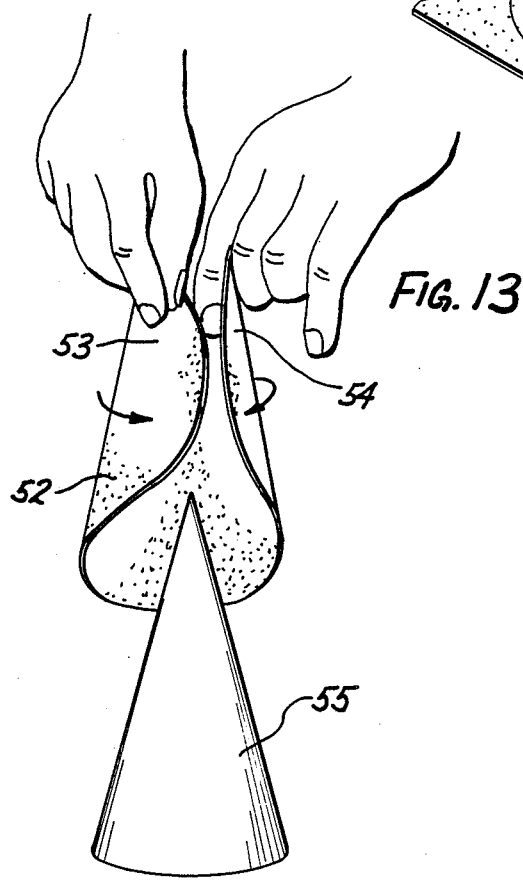
Figure 14:
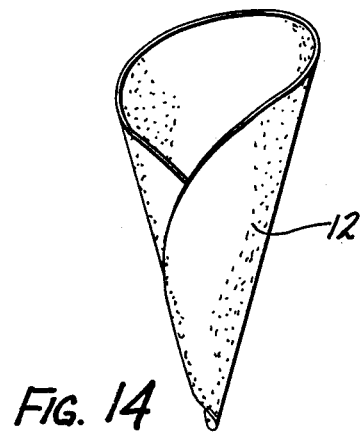
FIG. 14 is a pictorial view showing the pliable taco cone mold which is constructed in accordance with the present invention.

Referring now to FIG. 13, when the disc 52 has been smoothed, it is grasped by a pair of its sides 53 and 54 and wrapped around a dowel 55 having a conical shape. As the disc is wrapped around the dowel 55 its sides 53 and 54 are pressed together around the dowel, in an overlapping manner. As the sides 53 and 54 are pressed against the dowel 55 they form a hollow cone-shaped mold 12 having two open elliptical ends with a pair of overlapping sides that approximate the circumferential dimensions of the dowel. For the purpose of using the mold with standard taco sized tortilla, the height and base diameter of the dowel 55 should be approximately ten and three inches, respectively. It should be understood however, that other height and widths could be used for using the mold with other sized tortillas.

Once the mold 12 has been formed, the dowel 55 is removed and the mold 12 is ready for use.

It should be understood that the mold 12 is quite pliable and may be twisted by hand in a clockwise direction to tightly close the molds overlapping edges 53 and 54. Conversely, by using a counterclockwise twisting motion, the mold may be expanded so that the edges of 53 and 54 of the mold 12 are completely separated and no longer overlapping.

Thus, it is seen that there is provided a new and improved method of manufacturing a taco cone mold that is pliable.

The successive steps in the method of making a soft taco cone 120 with a closed apex 121 is illustrated in FIGS. 15-20, respectively.

Considering now the initial steps of making the soft taco cone 120 of FIG. 21, the initial steps are identical to the first six steps of making the crisp taco cone shell 31. This process includes placing a pliable tear shaped tortilla patty 130 on a flat smooth stationary surface 141 as shown in FIG. 15. Then, as best seen in FIG. 15 and 16, the mold 112, which is substantially identical to mold 12, is laid directly on top the tortilla patty 130 so that the apex portion 124 of the mold 112 is generally pointing in the same direction that the narrow end 131 of the patty 130 is aligned. The apex portion 124 of the mold 112 is also positioned in a spaced apart manner from the tip portion 131 of the patty at approximately one to one and one-eighth inches therefrom. The mold is then rotated about its longitudinal axis so that point 112A where the intersecting edges 25 and 26 of the overlapping portions of the mold is at about 65 to 80 degrees above the horizontal stationary surface 41.

With the mold 112 thus positioned, an edge 132 of the tortilla patty 130 is lifted by the preparer and aligning with its peripheral edge 132 in a generally overlaying relationship with edge 126 of the mold 112 and folded against the top surface 133 of the patty 130 adjacent the apex portion 124 of the mold 112 as best seen in FIG. 16. The mold 112, with the aligned tortilla patty 130 held in place by a finger of the preparer, is then rolled, along the stationary surface 41 as shown by the arrows in FIG. 17 until edge 132 of the patty commences to be folded under the mold 112 and against the top surface 133 of the patty 130 adjacent its narrow end 131. The mold 112 is then further rolled over the tucked in portion 131A of the tortilla patty 130 so the patty 130 folds on itself to form a closed apex as it is wrapped around the mold 112. Once the tortilla folds on itself, the edge 132 becomes secured against the top surface 133 of patty 130.

As best seen in FIGS. 18 and 19, the preparer 140 continues rolling the mold 112 along the stationary surface 41 on top of the patty 130 until the tortilla patty 130 completely wraps around the mold 112 so that a pair of its edges sliqhtly overlap.

Referring now to FIG. 20, the tortilla patty 130 is pinched in its lower portion, generally shown at A, with the fingers of the one of the hands of the food preparer. While so pinching the patty 130, the fingers of the other hand of the food preparer 140 pinch the upper respective surfaces 113 and 114 of the mold 112 toward each other (as shown by the arrows). In this manner, the tension on the inner surface of the tortilla patty 130 created by the mold 112 is thus eliminated so that the soft tortilla patty 130 may be easily nd conveniently removed from the mold 112.

It should be understood that any number tortilla patties may be prepared in this manner. As each patty is removed from the mold, it collapses on itself to form a flat soft tortilla shell as shown in FIG. 21. The flat soft tortilla shells may then be placed in the interior of one of the molds such as mold 12, as a temporary holder. Additional shells may then be formed stacking one within another until a desired quantity is made. They may then be removed from the mold and conveniently wrapped in a package or used as required.

Figure 22:
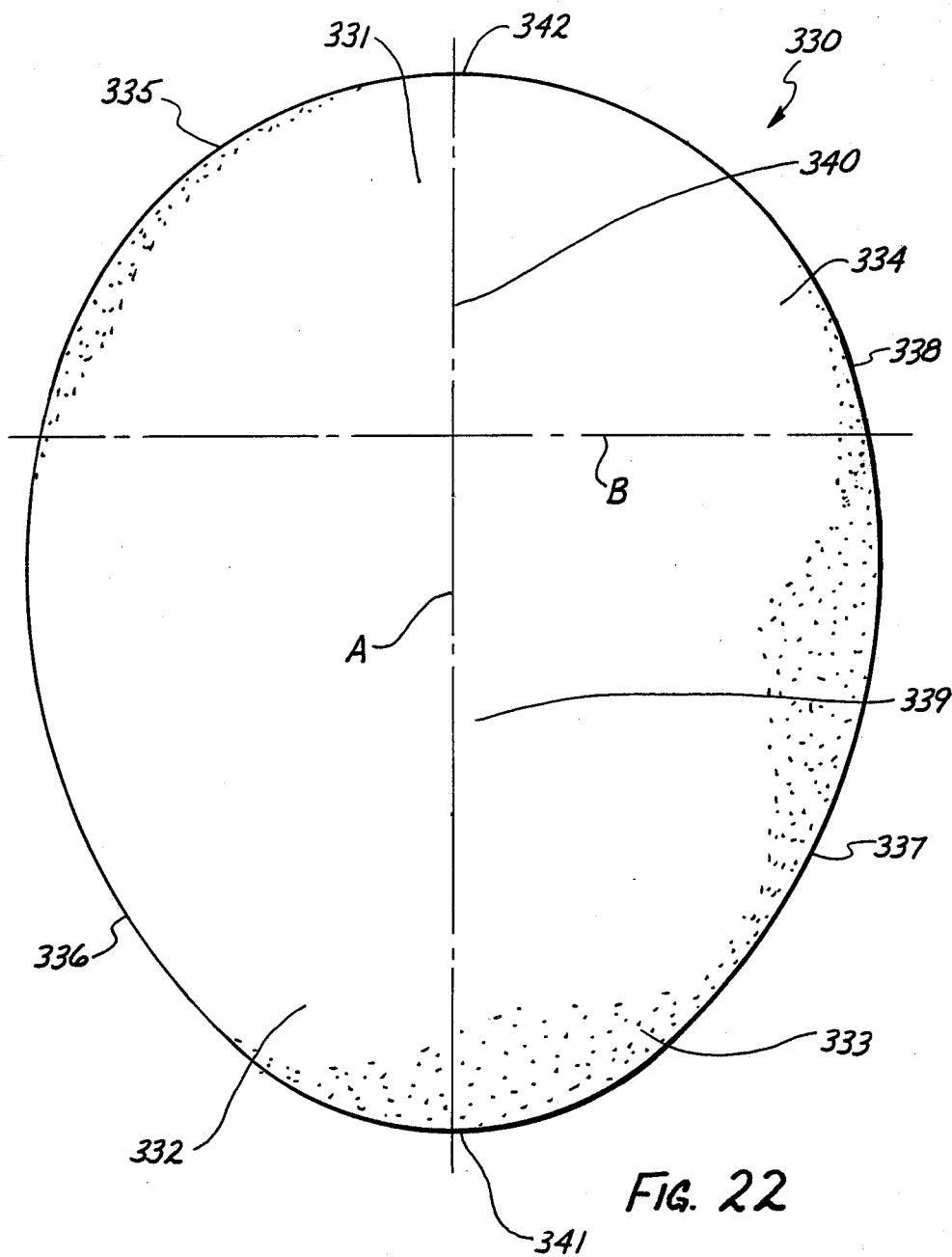
FIG. 22 is a plan view of a pliable tortilla patty, which is constructed in accordance with the present invention.

Referring now to the drawings, and more particularly to FIG. 22, there is shown a tortilla patty 330 having generally a non-circular oval shape which is used in accordance with the present invention.

More particularly, the tortilla patty 330 is of unitary integral construction composed of either wheat flour or corn flour material and that is generally cardioidal in shape about its longitudinal axis, generally designated as A. A traverse axis, generally designated as B divides the tortilla patty into a generally semi elliptical portion 339 and a generally semi circular portion 340.

Considering now the semi-elliptical portion 339 of the patty 330 in greater detail, it generally includes a pair of right and left portions 332 and 333, respectively. The right portion 332 includes a right side 336 that commences at the point where the transverse axis B divides the patty 330 on the right side at its peripheral edge and extends continuously therefrom to a rounded tip portion 341. The left portion 333 includes a left side 337 that commences at the point where the transverse axis B divides the patty 330 on the left side at its peripheral edge and extends continuously therefrom to the rounded tip portion 341. It should be understood that the right and left sides 336 and 337 of the patty 330 are substantially identical in shape and are joined together by the rounded tip portion 341.

Considering now the semi-circular portion 340 of the patty 330 in greater detail, it generally includes a pair of right and left portions 331 and 334, respectively. The right portion 331 includes a right side 335 that is contiguous to the right side 336 of the right portion 332 of the patty 330 and extends continuously therefrom to the rounded portion 342. The left portion 334 includes a left side 338 that is contiguous to the left side 337 of the left portion of the patty 330 and extends continuously therefrom to the rounded portion 342. It should be understood that the right and left sides 335 and 338 of the patty 330 are substantially identical in shape and are joined together by the rounded portion 342.

Considering now the dimensions of the patty 330, in the preferred embodiment the transverse axis B of the patty is approximately five and seven-eighth inches while the longitudinally axis A of the patty is seven and one-eighth inches. Although the preferred embodiment dimensions have been disclosed herein it should be understood that these dimensions may have a range that is proportionately larger or smaller, where a preferred range is 0.7420 to 0.9070.

A more preferred range however, is 0.7832 to 0.8658; and the most preferred is 0.8245.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of making a crisp conically shaped tortilla shell, which comprises:
   using a pliable corn or wheat flour tortilla patty having a rounded tip end portion;
   placing said pliable tortilla patty on a substantially flat surface;
   using at least two conically shaped molds each having an apex portion;
   positioning one of said molds on its side on the surface of said tortilla;
   aligning the rounded tip end portion of said tortilla patty adjacent to the apex portion of said one of said molds;
   moving relative to one another the mold and said aligned rounded tip end portion of said tortilla patty to wrap the tip end portion about the apex;
   moving a peripheral surface near the tip end portion of said patty only into engagement flat against the apex portion of the mold;
   holding the peripheral surface firmly against the apex portion;
   rolling the patty and the mold along the substantially flat surface until the patty peripheral surface commences to be moved under the mold and against the top surface of the patty adjacent to its rounded tip end;
   continuing to roll said mold and said patty to cause the patty tip end portion to tuck inwardly to form a closed apex tucked in portion thereby forming a conically shaped tortilla shell having a closed apex portion;
   inserting said tortilla wrapped mold into the open interior of the other one of said molds until said molds are secured nestled securing the tortilla patty between the interior surface of one mold and the exterior surface of the other mold;
   placing the nestled molds in a vessel of cooking oil;
   cooking the tortilla patty until it become a crisp cone-shaped shell having a closed apex portion;
   removing said molds and said cooked tortilla patty from said vessel; and then
   separating said cooked tortilla patty from said molds.

2. The method of claim 1 wherein the conically shaped hollow mold is laid with its apex end oriented toward and spaced apart from the tip end portion of the tortilla patty.

3. The method of claim 2 wherein the spaced apart distance varies in the range of 1.012 to 1.238 inches.

4. The method of claim 3 wherein the spaced apart distance is 1.125 inches.

5. The method of claim 2 wherein the intersecting point of the overlapping edge of said mold is positioned at an angle relative to said substantially flat surface, wherein said angle varies in the range of 60 degrees to 85 degrees.

6. The method of claim 5 wherein the angle of the intersecting point of the overlapping edges of said mold is 72.5 degrees.

7. The method of claim 1, further comprising:
   inserting a slice of cheese in the interior of said conically shaped tortilla shell; and
   melting said cheese to coat the interior surface of said cone.

8. The method according to claim 1, further comprising the step of using a clip to releasably secure said molds together.

9. The method of claim 1, wherein the tortilla patty is cooked approximately two minutes.

10. The method of claim 4 wherein the cooking oil is at a temperature that varies in the range of 330 degrees to 405 degrees Fahrenheit.

11. The method of claim 10 wherein the temperature is 375 degrees Fahrenheit.

* * * * *

UNITED STATES PATENT AND TRADEMARK OFFICE
CERTIFICATE OF CORRECTION

PATENT NO. : 4,915,964
DATED : April 10, 1990
INVENTOR(S) : Leo P. Smietana

It is certified that error appears in the above-identified patent and that said Letters Patent is hereby corrected as shown below:

In the abstract, line 8, after "cone", delete "from", and substitute --form--.

In the abstract, line 9, before "form", delete "come", and substitute --cone--.

Column 1, line 51, after "preparation", delete "tip", and substitute --time--.

Column 1, line 65, delete "3,604,343", and substitute --3,604,342--.

Column 8, line 1, after "easily", delete "nd", and substitute --and--.

Column 9, line 40, delete "secured", and substitute --securely--.

Column 10, line 4, delete "become", and substitute --becomes--.

Column 10, line 35, delete "4", and substitute --9--.

Signed and Sealed this

Twentieth Day of October, 1992

*Attest:*

DOUGLAS B. COMER

*Attesting Officer*         *Acting Commissioner of Patents and Trademarks*